US012634449B2

(12) United States Patent
Zhao et al.

(10) Patent No.: US 12,634,449 B2
(45) Date of Patent: May 19, 2026

(54) ENHANCED CHROMA INTRA MODE CODING

(71) Applicant: Tencent America LLC, Palo Alto, CA (US)

(72) Inventors: Liang Zhao, Palo Alto, CA (US); Xin Zhao, Palo Alto, CA (US); Jing Ye, Palo Alto, CA (US); Han Gao, Palo Alto, CA (US); Tianqi Liu, Palo Alto, CA (US); Madhu Peringassery Krishnan, Palo Alto, CA (US); Yushin Cho, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/815,660

(22) Filed: Aug. 26, 2024

(65) Prior Publication Data

US 2025/0294139 A1     Sep. 18, 2025

Related U.S. Application Data

(60) Provisional application No. 63/564,936, filed on Mar. 13, 2024.

(51) Int. Cl.

| | |
|---|---|
| *H04N 19/11* | (2014.01) |
| *H04N 19/132* | (2014.01) |
| *H04N 19/167* | (2014.01) |
| *H04N 19/176* | (2014.01) |
| *H04N 19/186* | (2014.01) |
| *H04N 19/593* | (2014.01) |
| *H04N 19/70* | (2014.01) |

(52) U.S. Cl.
CPC ........... *H04N 19/11* (2014.11); *H04N 19/167* (2014.11); *H04N 19/176* (2014.11); *H04N 19/186* (2014.11); *H04N 19/593* (2014.11); *H04N 19/132* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2020/0195960 A1* | 6/2020 | Zhang | H04N 19/184 |
| 2020/0296388 A1* | 9/2020 | Bordes | H04N 19/82 |
| 2022/0116636 A1* | 4/2022 | Kang | H04N 19/44 |
| 2022/0210460 A1* | 6/2022 | Deng | H04N 19/137 |
| 2025/0220170 A1* | 7/2025 | Li | H04N 19/186 |

* cited by examiner

*Primary Examiner* — Clifford Hilaire
(74) *Attorney, Agent, or Firm* — Morgan, Lewis & Bockius LLP

(57) ABSTRACT

The various implementations described herein include methods and systems for coding video. In one aspect, a method includes receiving a video bitstream comprising a plurality of blocks, including a chroma block. The method includes identifying a set of intra prediction modes for one or more luma positions collocated with the chroma block. The method includes populating a chroma mode list based on the set of intra prediction modes. The method also includes reconstructing the chroma block using a prediction mode from the chroma mode list.

19 Claims, 6 Drawing Sheets

550

552 Receive video data comprising a plurality of blocks, including a chroma block 554 Identify a set of intra prediction modes for one or more luma positions collocated with the chroma block 556 Populate a chroma mode list based on the set of intra prediction modes 558 Encode the chroma block using a prediction mode from the chroma mode list Communication System 100

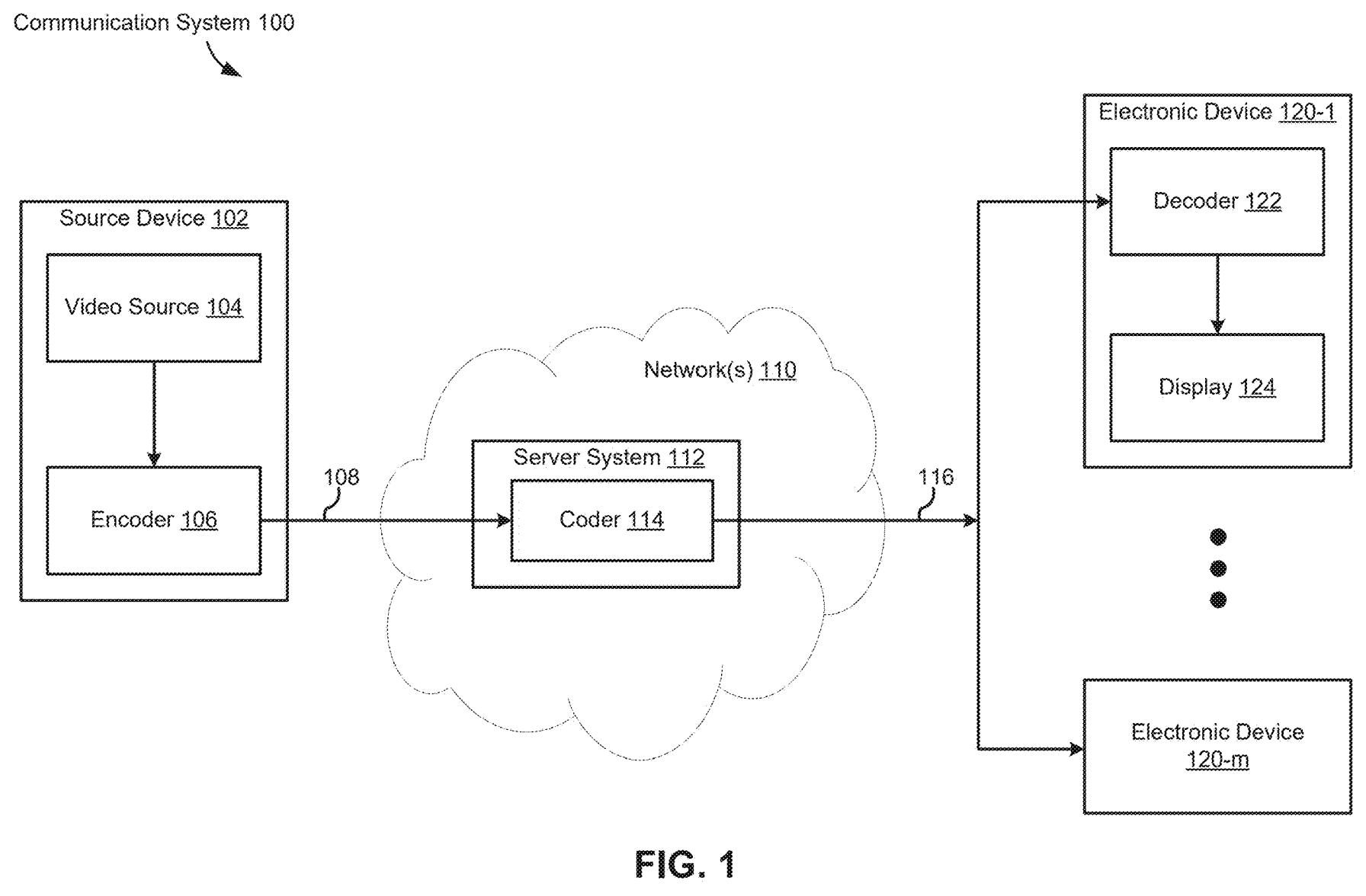

Source Device 102

Video Source 104

Encoder 106

108

Network(s) 110

Server System 112

Coder 114

116

Electronic Device 120-1

Decoder 122

Display 124

Electronic Device 120-m

FIG. 1

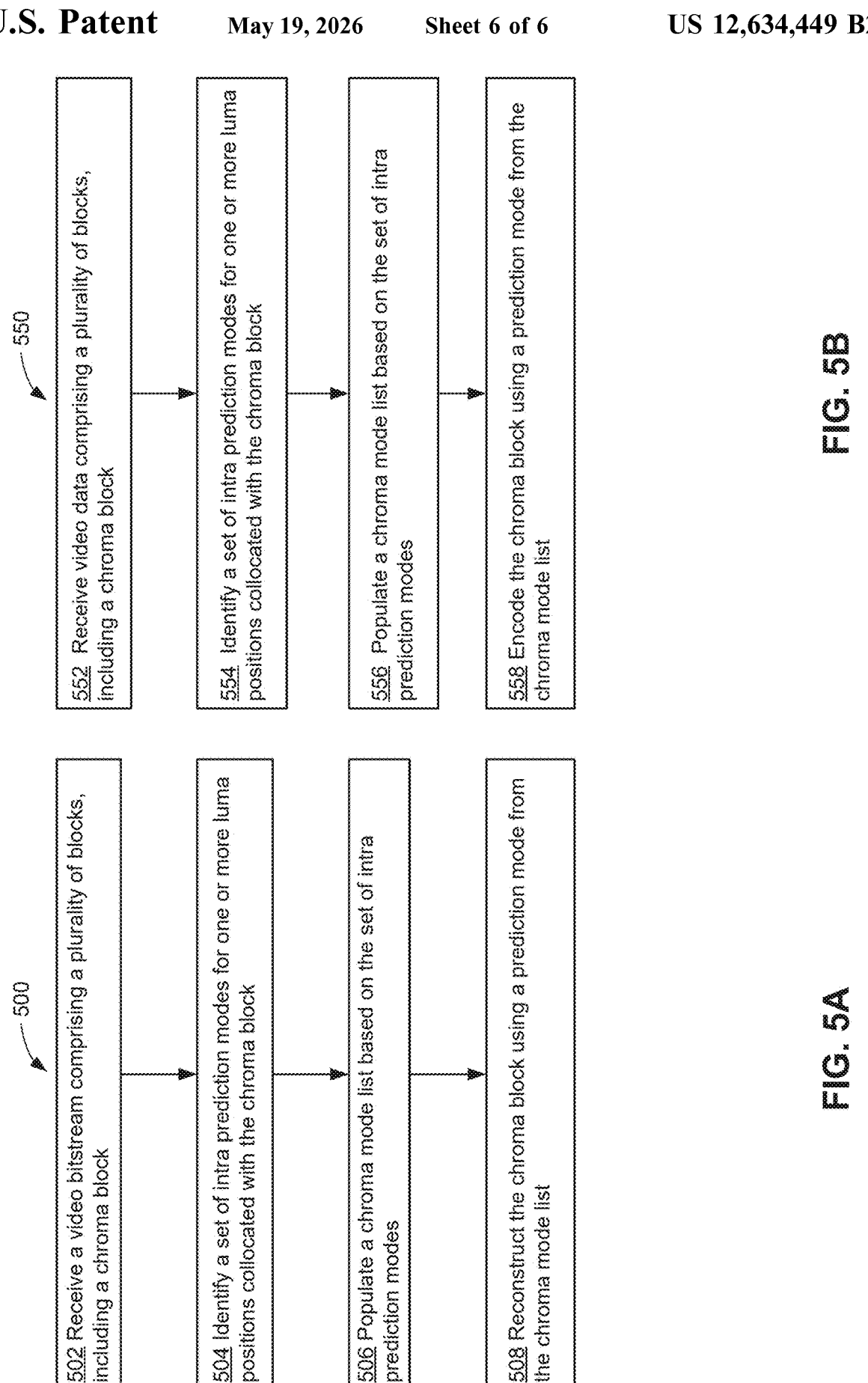

550

552 Receive video data comprising a plurality of blocks, including a chroma block 554 Identify a set of intra prediction modes for one or more luma positions collocated with the chroma block 556 Populate a chroma mode list based on the set of intra prediction modes 558 Encode the chroma block using a prediction mode from the chroma mode list

502 Receive a video bitstream comprising a plurality of blocks, including a chroma block 504 Identify a set of intra prediction modes for one or more luma positions collocated with the chroma block 506 Populate a chroma mode list based on the set of intra prediction modes 508 Reconstruct the chroma block using a prediction mode from the chroma mode list

FIG. 5A

ENHANCED CHROMA INTRA MODE CODING

RELATED APPLICATIONS

This application claims priority to U.S. Provisional Patent Application No. 63/564,936, entitled "Enhanced Chroma Intra Mode Coding" filed Mar. 13, 2024, which is hereby incorporated by reference in its entirety.

TECHNICAL FIELD

The disclosed embodiments relate generally to video coding, including but not limited to systems and methods for generating/populating an intra prediction mode list.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to generating/populating an intra prediction mode list (e.g., for chroma component coding). For example, when a collocated luma block is intra coded using a directional intra prediction mode, there is a higher probability that a prediction mode of the chroma block is also a directional intra prediction mode (e.g., the same directional intra prediction mode). Similarly, when a neighboring block is intra coded using a directional intra prediction mode, there is a higher probability that a prediction mode of the chroma block is also a directional intra prediction mode (e.g., the same directional intra prediction mode). By placing the directional intra prediction mode from the collocated luma block (and/or a neighboring chroma/luma block) of the chroma block in the chroma mode list (e.g., at a beginning or top of the list), accuracy of the prediction for the chroma block may be improved without having to increase the overhead associated with maintaining the chroma mode list (e.g., for a chroma mode list of a fixed length).

In accordance with some embodiments, a method of video decoding includes (i) receiving a video bitstream (e.g., a coded video sequence) comprising a plurality of blocks (e.g., corresponding to a set of pictures), including a chroma block; (ii) identifying a set of intra prediction modes for one or more luma positions collocated with the chroma block; (iii) populating a chroma mode list based on the set of intra prediction modes; and (iv) reconstructing the chroma block using a prediction mode from the chroma mode list.

In accordance with some embodiments, a method of video encoding includes (i) receiving video data (e.g., a source video sequence) comprising a plurality of blocks (e.g., corresponding to a set of pictures), including a chroma block; (ii) identifying a set of intra prediction modes for one or more luma positions collocated with the chroma block; (iii) populating a chroma mode list based on the set of intra prediction modes; and (iv) encoding the chroma block using a prediction mode from the chroma mode list.

In accordance with some embodiments, a method of processing visual media data includes: (i) obtaining a source video sequence that includes a plurality of frames; and (ii) performing a conversion between the source video sequence and a video bitstream of visual media data according to a format rule. The bitstream comprises a plurality of blocks, including a chroma block. The format rule specifies that a chroma mode list be populated based on a set of intra prediction modes for one or more luma positions collocated with the chroma block.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

Figure 2A:
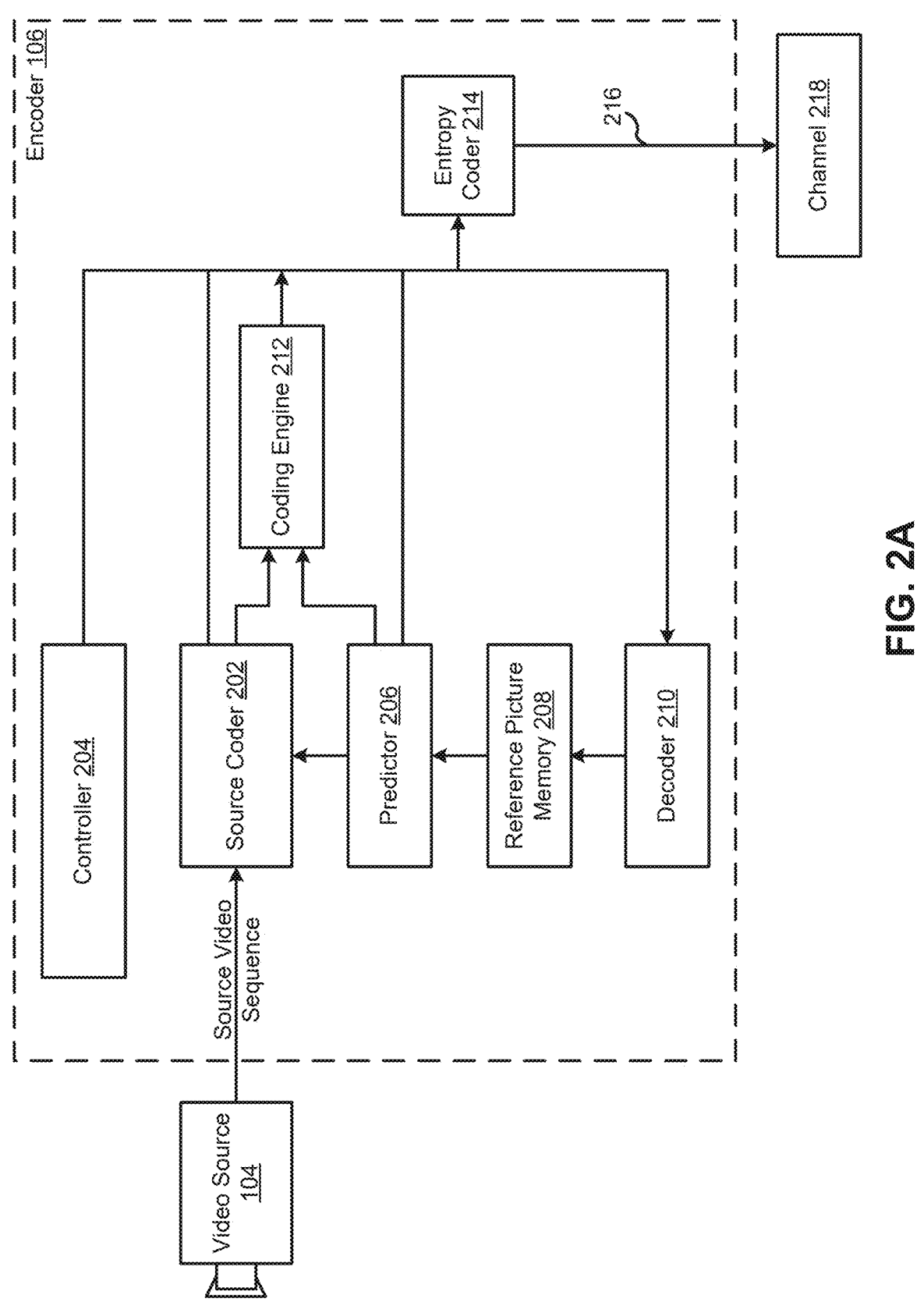

FIG. 2A is a block diagram illustrating example elements of an encoder component in accordance with some embodiments.

Figure 2B:
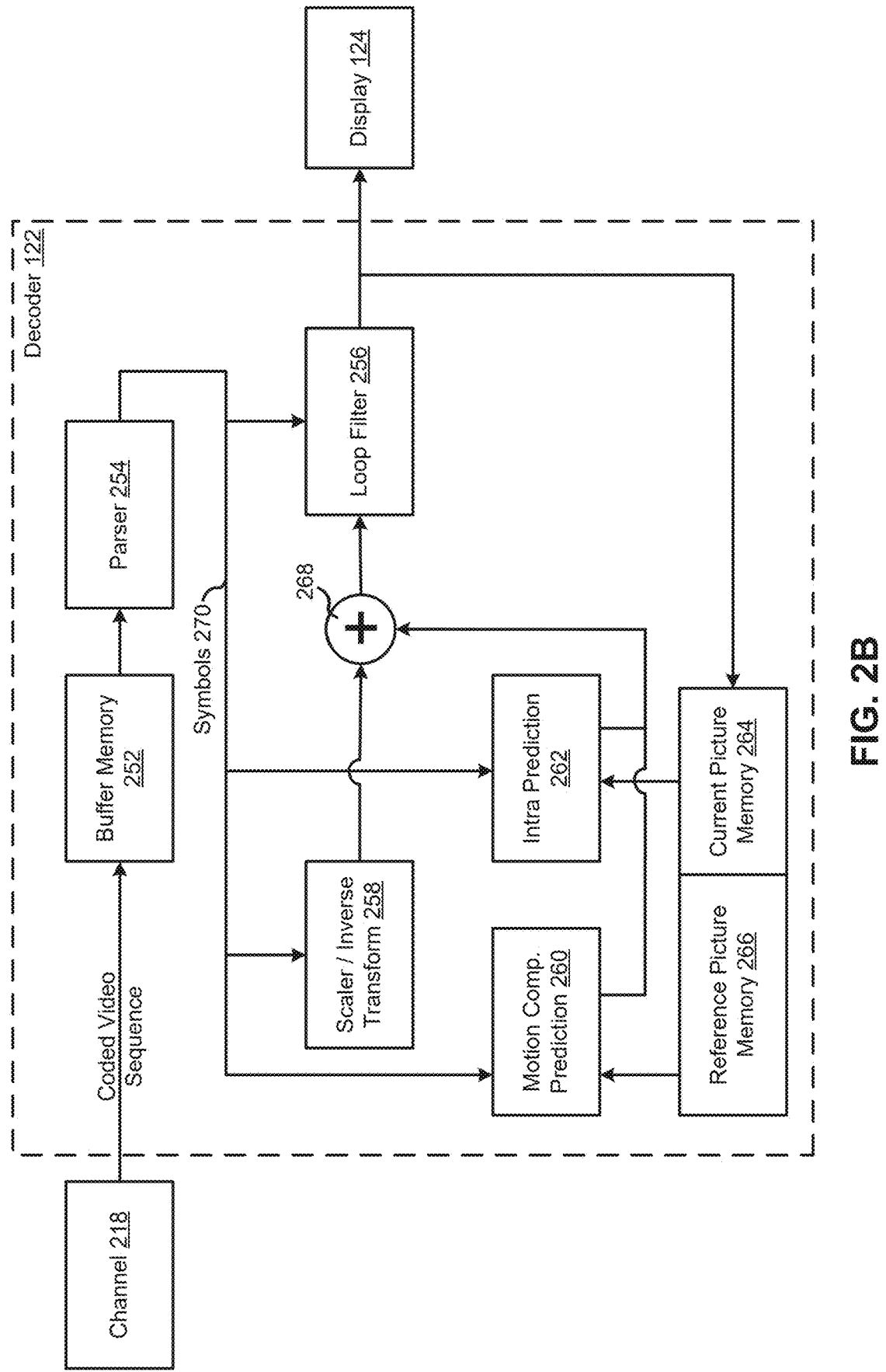

FIG. 2B is a block diagram illustrating example elements of a decoder component in accordance with some embodiments.

Figure 3:
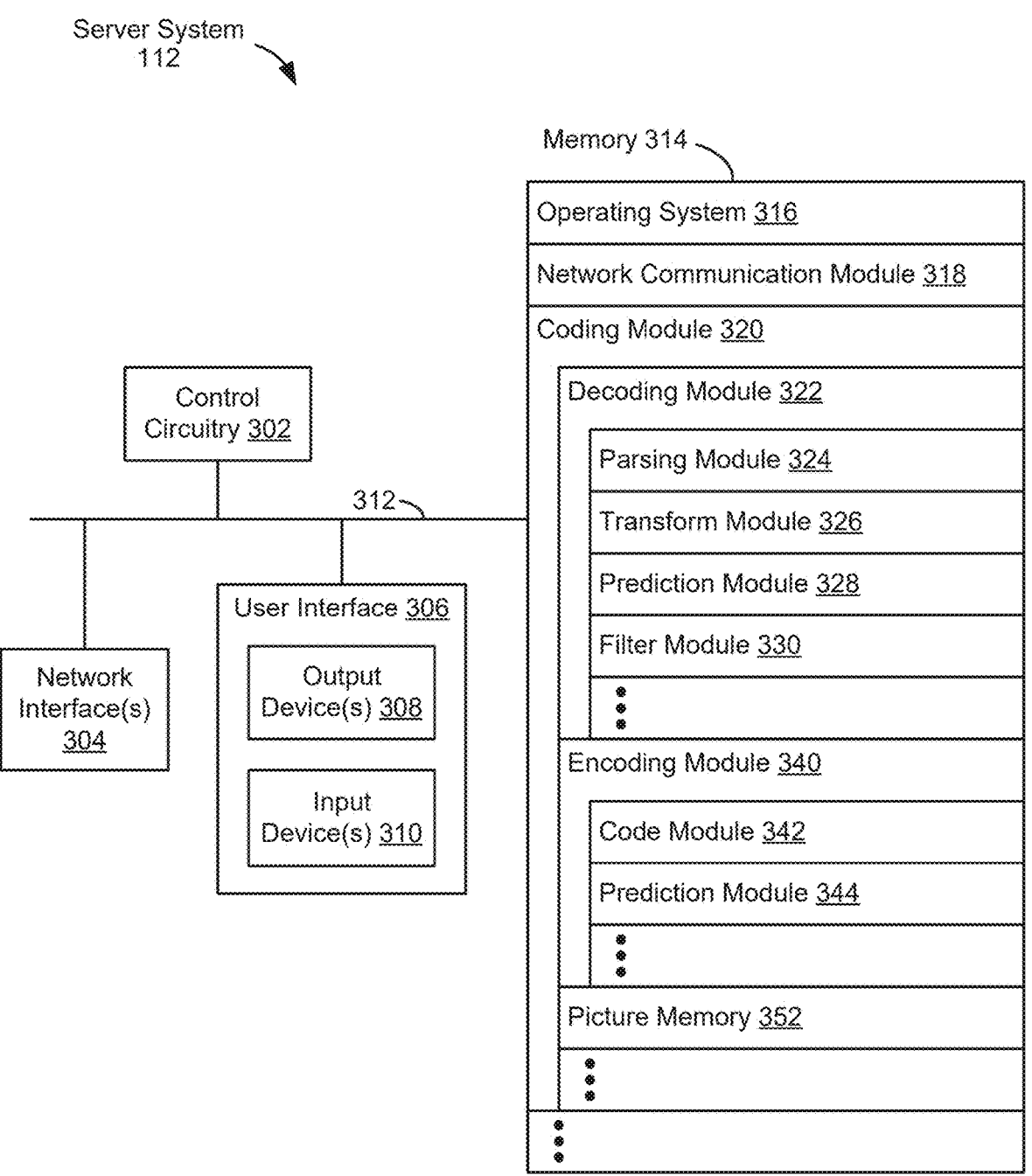

FIG. 3 is a block diagram illustrating an example server system in accordance with some embodiments.

Figure 4A:
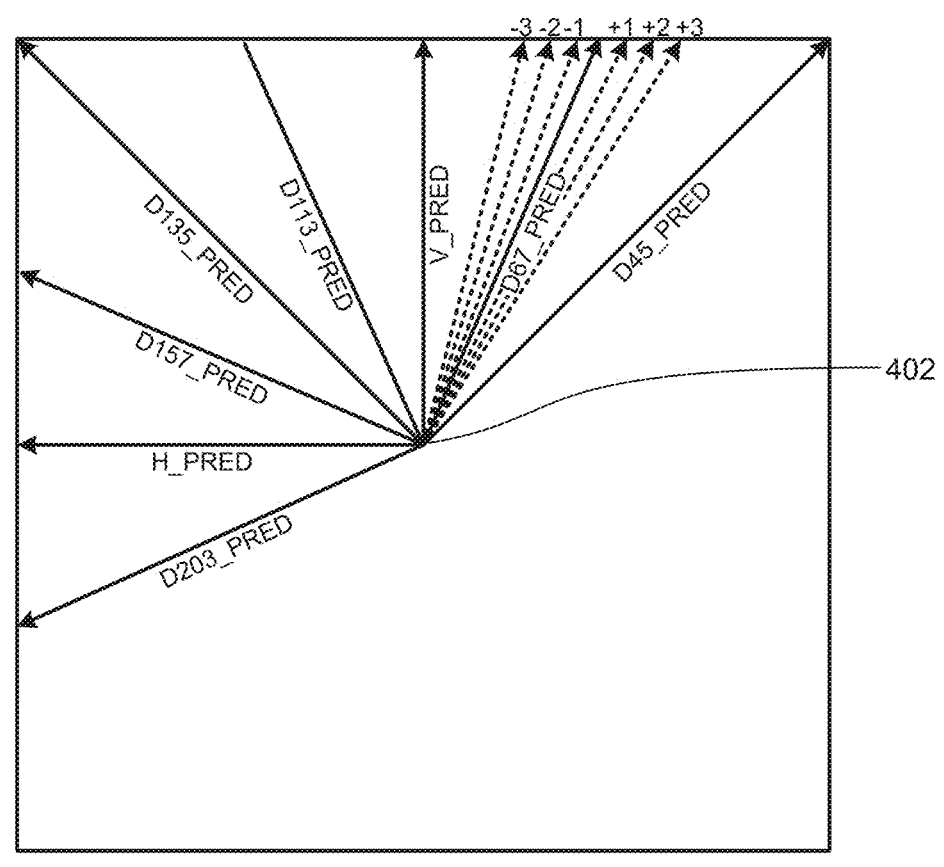

FIG. 4A shows a schematic illustration of an exemplary subset of directional intra prediction modes in accordance with some embodiments.

Figures 4B, 4C:
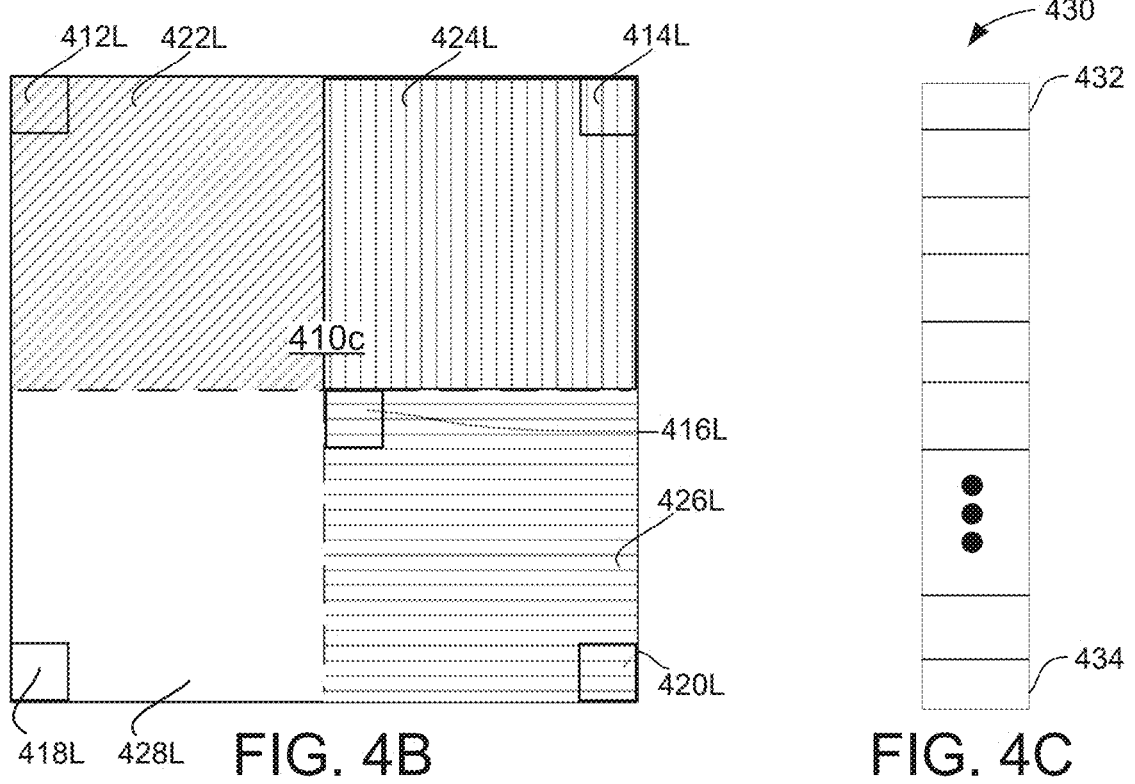

FIG. 4B shows an example of collocated luma blocks of a chroma block in accordance with some embodiments.

FIG. 4C shows a chroma mode list in accordance with some embodiments.

FIG. 5A illustrates an example video decoding process in accordance with some embodiments.

FIG. 5B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes video/image compression techniques including techniques for generating/populating a list of intra prediction modes for a chroma block (also sometimes referred to as a chroma mode list). The chroma mode list may be populated by checking for an intra prediction mode of collocated luma block (e.g., at one or more positions) of the chroma block. If a directional intra prediction mode is used for the collocated luma block, that directional intra prediction mode may be added to the chroma mode list. Similarly, the chroma mode list may be populated by checking for an intra prediction mode of a neighboring block of the chroma block. If a directional intra prediction mode is used for the neighboring block, that directional intra prediction mode may be added to the chroma mode list. By placing the directional intra prediction mode from the collocated luma block (and/or the neighboring blocks) of the chroma block in the chroma mode list (e.g., at a beginning or top of the chroma mode list), accuracy of the prediction for the chroma block may be improved without having to increase the overhead associated with maintaining the chroma mode list (e.g., for a chroma mode list of a fixed length).

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when subsample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). According to some embodiments, methods for intra prediction mode coding and generation/population of mode lists are described.

FIG. 4A depicts a subset of predictor directions of various directional intra prediction modes. For directional intra prediction, some approaches support 8 directional modes corresponding to angles from 45 to 207 degrees. To exploit more varieties of spatial redundancy in directional textures, directional intra modes may be extended to an angle set with finer granularity. For example, the 8 angles may be denoted as nominal angles. The 8 nominal angles, named V_PRED, H_PRED, D45_PRED, D135_PRED, D113_PRED, D157_PRED, D203_PRED, and D67_PRED, are shown in FIG. 4A. For each nominal angle, there may be 7 finer angles for a total of 56 directional angles. A prediction angle may be described by a nominal intra angle plus an angle delta. Thus, there are eight nominal directional intra prediction modes, each of which has an associated set of angle delta offsets ranging from −3 to +3. FIG. 4A shows the eight nominal modes (solid arrows) with an example of the set of angle delta offsets around the D67_PRED nominal mode (dotted arrows). The point 402 where the arrows converge represents the sample being predicted. The arrows represent the direction from which neighboring samples are used to predict the sample at point 402. For example, D45_PRED indicates that sample is predicted from a neighboring sample or samples to the upper right, at a 45-degree angle from the horizontal direction. Similarly, D203_PRED indicates that sample is predicted from a neighboring sample or samples to the lower left of sample, in a 22.5-degree angle from the horizontal direction.

FIG. 4B shows a chroma block 410c that is not further partitioned (e.g., the dotted lines show that the chroma block 410c is not partitioned into four smaller chroma blocks 422L, 424L, 426L and 428L). Thus, a single chroma block 410c is collocated with multiple luma blocks (e.g., the single chroma block may correspond to multiple merged luma blocks). For example, a single chroma block 410c has luma blocks 422L, 424L, 426L, and 428L as collocated luma blocks.

Entries for a chroma mode list for the prediction mode of the chroma block 410c may be derived based on a prediction mode of a luma block at a given position in this intra region. The given position may be a central position. For example, for the chroma block 410c, the prediction mode of the collocated luma block 416L at the central position may be checked. When the prediction mode for the collocated luma block 416L is a directional mode, the directional mode may be added to a chroma mode list of the chroma block 410.

FIG. 4C illustrates a chroma mode list 430 of the chroma block 410c. When the collocated luma block 416L is a directional mode (e.g., one of the modes illustrated in FIG. 4A or a different directional mode), that directional mode may be added as a top entry 432 of the chroma mode list 430. In some embodiments, the mode is added to a different portion of the chroma mode list 430. In some embodiments, the prediction mode of the collocated luma block 412L at the top-left corner is not checked if the prediction mode for the luma block 416L is a directional mode. In some embodiments, when the intra prediction mode of the collocated luma block 416 at the central position is not a directional mode, the collocated luma block 412L at a top-left position is checked. When the intra prediction mode of the collocated luma block 412L at a top-left position is a directional intra prediction, that directional intra prediction mode may be added into the chroma mode list (e.g., as the top entry 432 of the chroma mode list 430).

Instead of only checking the intra position mode of a collocated luma mode at a single location or not taking into account whether the intra position mode of the collocated luma mode at that single location is a directional intra prediction mode, the methods and systems described herein account for the higher probability that the prediction mode of the chroma block is also a directional intra prediction mode when a collocated luma block is intra coded using a directional mode. By placing the directional intra prediction mode from the collocated luma block as an entry (e.g., top entry 432) in the chroma mode list (e.g., chroma most list 430) of the chroma block, accuracy of the prediction may be improved. In some embodiments, the chroma mode list is maintained at a fixed size (e.g., 13 entries, 10 entries, 15 entries, or a different number of entries), and the directional intra prediction mode of the collocated luma block (or a neighboring block) is placed at the beginning of the chroma mode list 430 (e.g., as the top entry 432), thereby not increasing the overhead associated with maintaining the chroma mode list.

In some embodiments, after the collocated luma block 416L at the central position is determined to be a directional intra prediction mode and that directional intra prediction mode is added into the chroma mode list, the collocated luma block 412L at the top-left corner is checked and the intra prediction mode is added into the chroma mode list if the intra prediction mode of the collocated luma block 412L at the top-left corner is a directional intra prediction mode.

In some embodiments, when the intra prediction mode of a collocated luma block in a given position is a directional intra prediction mode (e.g., mode 67), the adjacent angles (e.g., mode 66 on the left of mode 67 and mode 68 on the right of mode 67) of a respective directional luma intra prediction mode are added into the chroma mode list after the directional intra prediction mode (e.g., mode 67) of the collocated luma mode has been added. The adjacent angles are referred to as luma intra prediction angle plus one and/or luma intra prediction angle minus one. For example, if the chroma block has a high correlation with the luma block, the prediction mode of the chroma block may still have some differences. In practice, test data may be used to determine which mode may have a smaller deviation (e.g., distortion) and the mode with the smaller distortion is then chosen (e.g., a chroma prediction is also performed using the mode 45 to determine if the prediction made using the mode 45 has a smaller distortion).

In some embodiments, when the intra prediction of the given position of the collocated luma block is a directional intra prediction mode, the nominal angles of the luma intra prediction mode (e.g., 45° mode, 135° mode, or other nominal angle modes) are also added into the chroma mode list before adding the default mode (e.g., V mode, H mode, and non-directional modes) to fill out the chroma mode list 430 (e.g. to fill the last entry 434 of the chroma mode list 430. In some embodiments, the chroma mode list 430 has 13 entries. In some embodiments, all the entries in the chroma mode list 430 are unique, and no redundant intra prediction modes are added to the chroma mode list 430.

In some embodiments, the length of the chroma mode list is fixed (e.g., 13 entries) or defined at the sequence/frame level regardless of the number of directional intra prediction mode in the collocated luma block.

In some embodiments, the length of the chroma mode list depends on the number of directional intra prediction modes in the collocated luma block. For example, the chroma mode list is shorter if the collocated luma blocks do not have or have fewer directional intra prediction mode. The chroma mode list is longer if the collocated luma blocks have more directional intra prediction modes.

In some embodiments, the intra prediction mode of the collocated luma block is checked from the center position (e.g., luma block 416L) to the top left position (e.g., luma block 412L) step by step. For example, if the collocated luma block in the central position (e.g., luma block 416L) does not have a directional mode, then the collocated luma block at above and to the left by 4 pixels (or a different number of pixels) is checked, in a scheme similar to a "reverse raster scan" until the collocated luma block at a respective location is a directional mode or until the top-left position (e.g., luma block 412L) is reached.

In some embodiments, the intra prediction mode of a collocated luma block is used to generate the chroma mode list when the block size (e.g., block width, block height, minimum of block width and block height, maximum of block width and block height, or number of samples in one block) of the chroma block is equal to or greater than one threshold. For example, such an approach may alleviate hardware concerns. Less (or no) checking would be performed for smaller chroma blocks, and/or smaller chroma blocks may use a default list of prediction mode, instead of an adaptive list as described herein. In some embodiments, the threshold is 64 samples in the chroma block. In some embodiments, different thresholds are used for different YUV subsampling format. In some embodiments, the threshold is signaled at the sequence, frame, slice or tile level.

In some embodiments, the coordinate value of a respective collocated luma block (e.g., center collocated luma block 416L, top-left collocated luma block 412L, top-right collocated luma block 414L, bottom-right collocated luma block 420L, or bottom-left collocated luma block 418L, or other positions relative to the current block) is rounded to the nearest value that is multiples of a given value (e.g., 2, or 4, or 8) to determine the coordinate of the luma block for which the intra prediction mode is fetched to build the chroma intra prediction mode list. For example, the intra prediction mode associated with the luma block located at the rounded coordinate is used to build the chroma mode list.

In some embodiments, in addition or alternatively to the methodologies described above, intra prediction modes of the neighboring chroma/luma blocks may be employed to generate the chroma mode list. In some embodiments, higher accuracy may be achieved by checking neighboring chroma blocks. In some embodiments, chroma blocks above and/or to a left of the current chroma block (e.g., chroma block 410c) are checked, and prediction modes are added to the chroma mode list if one or more of those neighboring chroma blocks are coded by directional intra prediction modes. In some embodiments, neighboring chroma blocks that are above and/or to a left of the current chroma block (e.g., chroma block 410c) are checked. In some embodiments, when their prediction modes are directional intra prediction modes, their adjacent directional angles are also added to the chroma mode list.

FIG. 5A is a flow diagram illustrating a method 500 of decoding video in accordance with some embodiments. The method 500 may be performed at a computing system (e.g., the server system 112, the source device 102, or the electronic device 120) having control circuitry and memory storing instructions for execution by the control circuitry. In some embodiments, the method 500 is performed by executing instructions stored in the memory (e.g., the memory 314) of the computing system.

The system receives (502) a video bitstream (e.g., a coded video sequence) comprising a plurality of blocks, including a chroma block. The system identifies (504) a set of one or more intra prediction modes for one or more luma positions collocated with the chroma block (e.g., corresponding to one or more collocated luma blocks). The system populates (506) a chroma mode list based on the set of intra prediction modes. The system reconstructs (508) the chroma block using a prediction mode from the chroma mode list. In this way, luma intra prediction modes at one or more positions of collocated luma block(s) may be employed to generate the chroma mode list. In some embodiments, the intra prediction mode of a central position and/or a top-left position of the collocated luma block is utilized to generate the chroma mode list.

In some embodiments, the intra prediction mode of a central position of a collocated luma block is first checked. When the intra prediction mode of central position of collocated luma block is a directional mode, this luma mode is added into the chroma mode list, and the top-left position of the collocated luma block is not checked any more. Otherwise, when the intra prediction mode of the central position of the collocated luma block is not a directional mode, the top-left position of the collocated luma block is checked. When the intra prediction mode of the top-left position of the collocated luma block is a directional intra prediction, this intra prediction mode will be added into the chroma mode list.

In some embodiments, the intra prediction mode of the central position of the collocated luma block is first checked. When the intra prediction mode of the central position of the collocated luma block is a directional mode, then this luma mode is added into the chroma mode list. After that, the intra prediction mode of the top-left position of collocated luma block is then checked. When the intra prediction mode of the top-left position of the collocated luma block is a directional intra prediction, this intra prediction mode is also added into the chroma mode list.

In some embodiments, when the intra prediction of a given position of a collocated luma block is a directional intra prediction mode, the adjacent angles of the luma intra prediction mode may also be added into the chroma mode list after the collocated luma mode has been added. For example, the adjacent angles are referred to as luma intra prediction angle plus one or luma intra prediction angle minus one.

In some embodiments, when the intra prediction of a given position of a collocated luma block is a directional intra prediction mode, the nominal angles of the luma intra prediction mode may also be added into the chroma mode list before the default mode is added into the chroma mode list.

In some embodiments, the length of the chroma mode list is fixed or defined at a sequence or frame level regardless of the number of collocated luma intra prediction modes that are directional intra prediction modes. In some embodiments, the length of the chroma mode list may depend on the number of collocated luma intra prediction modes that are directional intra prediction modes.

In some embodiments, the intra prediction mode of the collocated luma block is checked from the center to the top left step by step. For example, if the center luma mode is not a directional mode, then the collocated luma block above and left by 4 pixels is checked to determine if it is a directional mode, until one directional mode is found or until the collocated luma block at a top-left position is checked.

In some embodiments, the intra prediction mode of collocated luma block is employed to generate the chroma mode list when the block size of the chroma block is equal to or greater than one threshold. Block size can refer to block width, block height, minimum of block width and block height, maximum of block width and block height, or number of samples in one block. For example, the threshold is set to 64 samples in a chroma block. For example, the threshold may be different for different YUV subsampling format. In another example, the threshold is signaled at the sequence, frame, slice, or tile level.

In some embodiments, to determine the coordinate of the luma block for which the intra prediction mode is fetched and used to build the chroma intra prediction mode list, the coordinate value of the (center/top-left/or other positions relative to the current block) luma block is rounded to the nearest value that is a multiple of a given value (e.g., 2, or 4, or 8), then the intra prediction mode associated with the luma block located at the rounded coordinate is used to build the chroma mode list.

In some embodiments, luma intra prediction modes of the neighboring chroma blocks may be employed to generate the chroma mode list. In some embodiments, above and/or left neighboring chroma blocks are checked. When they are coded by directional intra prediction modes, their prediction modes will be added to the chroma mode list. In some embodiments, above and/or left neighboring chroma blocks are checked. When their prediction modes are directional intra prediction modes, their adjacent directional angles may also be added to the chroma mode list.

FIG. 5B is a flow diagram illustrating a method 550 of encoding video in accordance with some embodiments. The method 550 may be performed at a computing system (e.g., the server system 112, the source device 102, or the electronic device 120) having control circuitry and memory storing instructions for execution by the control circuitry. In some embodiments, the method 550 is performed by executing instructions stored in the memory (e.g., the memory 314) of the computing system. In some embodiments, the method 550 is performed by a same system as the method 500 described above.

The system receives (552) a video data (e.g., a source video sequence) comprising a plurality of blocks, including a chroma block. The system identifies (554), a set of intra prediction modes for one or more luma positions collocated with the chroma block. The system populates (556) a chroma mode list based on the set of intra prediction modes. The system encodes (558) the chroma block using a prediction mode from the chroma mode list. As described previously, the encoding process may mirror the decoding processes described herein (e.g., the chroma mode list generation/population techniques described above). For brevity, those details are not repeated here.

Although FIGS. 5A and 5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning Now to Some Example Embodiments.

(A1) In one aspect, some embodiments include a method (e.g., the method 500) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream (e.g., a coded video sequence) comprising a plurality of blocks, including a chroma block; (ii) identifying a set of intra prediction modes for one or more luma positions collocated with the chroma block; (iii) populating a chroma mode list based on the set of intra prediction modes; and (iv) reconstructing the chroma block using a prediction mode from the chroma mode list. For example, luma intra prediction modes at one position or multiple positions of a collocated luma block may be employed to generate the chroma mode list. In some embodiments, the chroma block is reconstructed using a motion vector obtained according to the prediction mode from the chroma mode list. In some embodiments, high probability modes are placed at the top of the chroma mode list. In some embodiments, the chroma mode list is a list of intra prediction modes. In some embodiments, the prediction mode from the chroma mode list is an intra prediction mode (e.g., a directional intra prediction mode).

(A2) In some embodiments of A1, the one or more luma positions comprise one or more of a central position with respect to the chroma block, and a top-left position with respect to the chroma block. For example, the intra prediction mode of central position and/or the top-left position of the collocated luma block is utilized to generate the chroma mode list.

(A3) In some embodiments of A2, populating the chroma mode list based on the set of intra prediction modes comprises checking whether each intra prediction mode in the set of intra prediction modes is a directional intra prediction mode, and the central position is checked before the top-left position. For example, the intra prediction mode of a central position of collocated luma block is first checked. When the intra prediction mode of the central position of collocated luma block is a directional mode, then this luma mode is added into the chroma mode list. After that, the intra prediction mode of top-left position of collocated luma block is then checked. When the intra prediction mode of the top-left position of the collocated luma block is a directional intra prediction, this intra prediction mode is also added into the chroma mode list.

(A4) In some embodiments of A3, checking whether each intra prediction mode in the set of intra prediction modes is a directional intra prediction mode comprises checking the central position to the top-left position in a step-by-step manner. For example, the intra prediction mode of the collocated luma block is checked from the center to the top-left step by step. In one example, if the center luma mode is not directional mode, then it will move above left by 4 pixels to check if that position is directional mode, e.g., until a directional mode is found or the top-left position is checked.

(A5) In some embodiments of any of A1-A4, populating the chroma mode list based on the set of intra prediction modes comprises including directional intra prediction modes from the set of intra prediction modes in the chroma mode list. For example, only directional intra prediction modes for collocated luma blocks are added.

(A6) In some embodiments of A1, populating the chroma mode list based on the set of intra prediction modes comprises (i) when a prediction mode of a first luma position with respect to the chroma block is a directional intra prediction mode: (a) including the directional intra prediction mode in the chroma mode list; and (b) not checking a prediction mode of a second luma position with respect to the chroma block; and (ii) when the prediction mode of the first luma position with respect to the chroma block is not a directional intra prediction mode: (1) not including the directional intra prediction mode in the chroma mode list; and (2) checking the prediction mode of the second luma position with respect to the chroma block. For example, the intra prediction mode of central position of collocated luma block is first checked. When the intra prediction mode of central position of collocated luma block is a directional mode, then this luma mode is added into the chroma mode list, and the top-left position of collocated luma block is not checked. When the intra prediction mode of central position of the collocated luma block is not a directional mode, the top-left position of the collocated luma block is checked. When the intra prediction mode of the top-left position of the collocated luma block is a directional intra prediction, this intra prediction mode is added into the chroma mode list. In some embodiments, additional luma positions are not checked when the prediction mode of the first luma position is a directional intra prediction mode. In some embodiments, the first luma position is a central position and the second luma position is a top-left position. In some embodiments, the first luma position is a top-left position and the second luma position is a central position. In some embodiments, in accordance with a determination that a prediction mode of a first luma position with respect to the chroma block is a directional intra prediction mode: (i) the directional intra prediction mode is included in the chroma mode list; and (ii) a prediction mode of a second luma position with respect to the chroma block is not checked (e.g., forgo checking the prediction mode of the second luma position).

(A7) In some embodiments of any of A1-A6, populating the chroma mode list based on the set of intra prediction modes comprises, when a prediction mode of a first luma position with respect to the chroma block is a directional intra prediction mode: (i) including the directional intra prediction mode in the chroma mode list; and (ii) including one or more additional directional intra prediction modes in the chroma mode list. For example, when the intra prediction of the given position of collocated luma block is a directional intra prediction mode, the adjacent angles of the luma intra prediction mode may be also added into the chroma mode list after adding the collocated luma mode.

(A8) In some embodiments of A7, the one or more additional directional intra prediction modes have corresponding angles that are adjacent to an angle of the directional intra prediction mode. For example, the adjacent angles are referred to as luma intra prediction angle plus one and luma intra prediction angle minus one.

(A9) In some embodiments of A7 or A8, the one or more additional directional intra prediction modes comprise nominal angles of the directional intra prediction mode. For example, when the intra prediction of the given position of collocated luma block is a directional intra prediction mode, the nominal angles of the luma intra prediction mode may be also added into the chroma mode list before adding the default mode into the chroma mode list.

(A10) In some embodiments of any of A1-A9, a size of the chroma mode list is independent of the set of intra prediction modes. For example, the length of the chroma mode list is fixed or defined in high level syntax regardless of how many collocated luma intra prediction modes are directional intra prediction modes.

(A11) In some embodiments of any of A1-A9, a size of the chroma mode list is dependent on a number of directional intra prediction modes in the set of intra prediction modes. For example, the length of chroma mode list may depend on the number of collocated luma intra prediction modes being directional intra prediction modes.

(A12) In some embodiments of any of A1-A11, the chroma mode list is populated based on the set of intra prediction modes when a block size of the chroma block meets one or more criteria. For example, the intra prediction mode of collocated luma block is employed to generate the chroma mode list when the block size of the chroma block is equal to or greater than one threshold. Block size may refer to a block width, a block height, a minimum of block width and block height, a maximum of block width and block height, and/or a number of samples in one block. In some embodiments, when the block size of the chroma block does not meet the one or more criteria, the chroma mode list is populated without regard to the set of intra prediction modes. In some embodiments, the chroma mode list is populated based on the set of intra prediction modes in accordance with a determination that a block size of the chroma block meets one or more criteria.

(A13) In some embodiments of A12, the one or more criteria comprises a criterion that the chroma block include at least 64 samples. For example, the threshold is set to 64 samples in chroma block.

(A14) In some embodiments of A12 or A13, the one or more criteria are based on a subsampling format. For example, the threshold may be different for different YUV subsampling formats.

(A15) In some embodiments of any of A12-A14, the one or more criteria are signaled in high level syntax of the video bitstream. For example, the threshold is signaled at the sequence, frame, slice, or tile level.

(A16) In some embodiments of any of A1-A15, the method includes identifying the one or more luma positions collocated with the chroma block, including rounding a coordinate value of a luma position of the one or more luma positions. For example, to determine the coordinate of the luma block (for which the intra prediction mode is to be fetched and used to build the chroma intra prediction mode list) the coordinate value of the luma block is rounded to the nearest value that is a multiple of a given value (e.g., 2, or 4, or 8), then the intra prediction mode associated with the luma block located at the rounded coordinate is used to build the chroma mode list.

(A17) In some embodiments of any of A1-A16, the method includes further populating the chroma mode list with a second set of intra prediction modes for one or more chroma blocks neighboring the chroma block. For example, luma intra prediction modes of the neighboring chroma blocks may be employed to generate the chroma mode list. In some embodiments, when an intra prediction mode of a neighboring chroma block is added to the chroma mode list, one or more additional intra prediction modes are also added to the chroma mode list, the one or more additional intra predictions including adjacent directional angles. For example, above and/or left neighboring chroma blocks are checked. When their prediction modes are directional intra prediction modes, their adjacent directional angles may also be added to the chroma mode list.

(A18) In some embodiments of A17, the one or more chroma blocks neighboring the chroma block comprise a chroma block above the chroma block and a chroma block left of the chroma block. For example, above and/or left neighboring chroma blocks are checked. When they are coded by directional intra prediction modes, their prediction modes are added to the chroma mode list.

(B1) In another aspect, some embodiments include a method (e.g., the method 550) of video encoding. In some embodiments, the method is performed at a computing system (e.g., the server system 112) having memory and control circuitry. In some embodiments, the method is performed at a coding module (e.g., the coding module 320). The method includes: (i) receiving video data (e.g., a source video sequence) comprising a plurality of blocks, including a chroma block; (ii) identifying a set of intra prediction modes for one or more luma positions collocated with the chroma block; (iii) populating a chroma mode list based on the set of intra prediction modes; and (iv) encoding the chroma block using a prediction mode from the chroma mode list.

(C1) In another aspect, some embodiments include a method of visual media data processing. In some embodiments, the method is performed at a computing system (e.g., the server system 112) having memory and control circuitry. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data according to a format rule. The video bitstream comprises a plurality of blocks, including a chroma block. The format rule specifies that a chroma mode list be populated based on a set of intra prediction modes for one or more luma positions collocated with the chroma block.

(D1) In one aspect, some embodiments include a method of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream (e.g., a coded video sequence) comprising a plurality of blocks, including a chroma block; (ii) identifying a set of intra prediction modes for one or more chroma blocks neighboring the chroma block; (iii) populating a chroma mode list based on the set of intra prediction modes; and (iv) reconstructing the chroma block using a prediction mode from the chroma mode list. In some embodiments, the set of intra prediction modes for the one or more chroma blocks comprise luma intra prediction modes for collocated luma blocks for the one or more chroma blocks.

(D2) In some embodiments of D1, the one or more chroma blocks comprise a first block left of the chroma block and a second block above the chroma block.

(D3) In some embodiments of D1 or D2, populating the chroma mode list based on the set of intra prediction modes comprises, when a prediction mode of a first chroma block of the one or more chroma blocks is a directional intra prediction mode: including the directional intra prediction mode in the chroma mode list; and including one or more additional directional intra prediction modes in the chroma mode list. In some embodiments, the one or more additional directional intra prediction modes have corresponding angles that are adjacent to an angle of the directional intra prediction mode. In some embodiments, the one or more additional directional intra prediction modes comprise nominal angles of the directional intra prediction mode.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A18, B1, C1, and D1-D3 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A18, B1, C1, and D1-D3 above).

Unless otherwise specified, any of the syntax elements (e.g., indicators) described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a plurality of blocks, including a chroma block;
   identifying a set of intra prediction modes for one or more luma positions collocated with the chroma block;
   populating a chroma mode list based on the set of intra prediction modes; and
   reconstructing the chroma block using a prediction mode from the chroma mode list, wherein the chroma mode list is populated based on the set of intra prediction modes when a block size of the chroma block meets one or more criteria such that the chroma mode list is populated using the intra prediction mode of a collocated luma block.

2. The method of claim 1, wherein the one or more luma positions comprise one or more of a central position with respect to the chroma block, and a top-left position with respect to the chroma block.

3. The method of claim 2, wherein populating the chroma mode list based on the set of intra prediction modes comprises checking whether each intra prediction mode in the set of intra prediction modes is a directional intra prediction mode, and wherein the central position is checked before the top-left position.

4. The method of claim 3, wherein checking whether each intra prediction mode in the set of intra prediction modes is a directional intra prediction mode comprises checking the central position to the top-left position in a step-by-step manner.

5. The method of claim 1, wherein populating the chroma mode list based on the set of intra prediction modes comprises including directional intra prediction modes from the set of intra prediction modes in the chroma mode list.

6. The method of claim 1, wherein populating the chroma mode list based on the set of intra prediction modes comprises:
   when a prediction mode of a first luma position with respect to the chroma block is a directional intra prediction mode:
      including the directional intra prediction mode in the chroma mode list; and
      not checking a prediction mode of a second luma position with respect to the chroma block; and
   when the prediction mode of the first luma position with respect to the chroma block is not a directional intra prediction mode:
      not including the directional intra prediction mode in the chroma mode list; and checking the prediction mode of the second luma position with respect to the chroma block.

7. The method of claim 1, wherein populating the chroma mode list based on the set of intra prediction modes comprises, when a prediction mode of a first luma position with respect to the chroma block is a directional intra prediction mode:
   including the directional intra prediction mode in the chroma mode list; and
   including one or more additional directional intra prediction modes in the chroma mode list.

8. The method of claim 7, wherein the one or more additional directional intra prediction modes have corresponding angles that are adjacent to an angle of the directional intra prediction mode.

9. The method of claim 7, wherein the one or more additional directional intra prediction modes comprise nominal angles of the directional intra prediction mode.

10. The method of claim 1, wherein a size of the chroma mode list is independent of the set of intra prediction modes.

11. The method of claim 1, wherein a size of the chroma mode list is dependent on a number of directional intra prediction modes in the set of intra prediction modes.

12. The method of claim 1, wherein the one or more criteria comprises a criterion that the chroma block include at least 64 samples.

13. The method of claim 1, wherein the one or more criteria are based on a subsampling format.

14. The method of claim 1 wherein the one or more criteria are signaled in high level syntax of the video bitstream.

15. The method of claim 1, further comprising identifying the one or more luma positions collocated with the chroma block, including rounding a coordinate value of a luma position of the one or more luma positions.

16. The method of claim 1, further comprising further populating the chroma mode list with a second set of intra prediction modes for one or more chroma blocks neighboring the chroma block.

17. The method of claim 16, wherein the one or more chroma blocks neighboring the chroma block comprise a chroma block above the chroma block and a chroma block left of the chroma block.

18. A computing system, comprising:
   control circuitry;
   memory; and
   one or more sets of instructions stored in the memory and configured for execution by the control circuitry, the one or more sets of instructions comprising instructions for:
      receiving video data comprising a plurality of blocks, including a chroma block;
      identifying a set of intra prediction modes for one or more luma positions collocated with the chroma block;
      populating a chroma mode list based on the set of intra prediction modes; and
      encoding the chroma block using a prediction mode from the chroma mode list, wherein the chroma mode list is populated based on the set of intra prediction modes when a block size of the chroma block meets one or more criteria such that the chroma mode list is populated using an intra prediction mode of a collocated luma block.

19. A non-transitory computer-readable storage medium storing a video bitstream that is generated by a video encoding method, the video encoding method comprising:

receiving video data comprising a plurality of blocks, including a chroma block;

identifying a set of intra prediction modes for one or more luma positions collocated with the chroma block;

populating a chroma mode list based on the set of intra prediction modes; and encoding the chroma block using a prediction mode from the chroma mode list, wherein the chroma mode list is populated based on the set of intra prediction modes when a block size of the chroma block meets one or more criteria such that the chroma mode list is populated using the intra prediction mode of a collocated luma block; and wherein the bitstream comprises the encoded chroma block and syntax elements associated with a chroma mode list be populated based on a set of intra prediction modes for one or more luma positions collocated with the chroma block.

* * * * *